US009197991B2

(12) United States Patent
Colangelo et al.

(10) Patent No.: US 9,197,991 B2
(45) Date of Patent: *Nov. 24, 2015

(54) LOCATION-BASED CONTENT ENABLEMENT SYSTEM

(71) Applicant: Spayce, Inc., San Francisco, CA (US)

(72) Inventors: Patrick Colangelo, Cambridge, MA (US); Christopher Taylor, Minneapolis, MN (US)

(73) Assignee: Spayce, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/523,834

(22) Filed: Oct. 24, 2014

(65) Prior Publication Data

US 2015/0215734 A1 Jul. 30, 2015

Related U.S. Application Data

(63) Continuation of application No. 14/164,197, filed on Jan. 25, 2014.

(51) Int. Cl.
*H04W 24/00* (2009.01)
*H04W 4/02* (2009.01)

(52) U.S. Cl.
CPC ...................................... *H04W 4/02* (2013.01)

(58) Field of Classification Search
CPC ....... H04W 4/02; H04W 64/00; H04W 88/02; H04W 8/18; H04M 1/72522; H04M 1/72527; H04M 1/7253; H04M 2250/52; H04M 2207/18
USPC ............. 455/456.1, 456.3, 456.6, 557, 556.1, 455/414.2
See application file for complete search history.

(56) References Cited

U.S. PATENT DOCUMENTS

2013/0012237 A1* 1/2013 Hamynen et al. .......... 455/456.3
2014/0162697 A1* 6/2014 Cudalbu et al. ............ 455/456.3

* cited by examiner

*Primary Examiner* — Temica M Beamer
(74) *Attorney, Agent, or Firm* — Redbrick IP

(57) ABSTRACT

A content enablement system enables or disables playback or viewing of a content file based on the proximity of a portable electronic device (PED) of a user with an object. The content file is generated and associated with the object only when the PED is within a predetermined distance of the object. The system thereafter only enables playback of the content file if the PED is within the predetermined distance of the object. The system includes location services, content playback, and content capturing modules, all of which may be executed on the PED or a server communicating with the PED through a network. The content files associated with the object may be grouped into a virtual property, the moderating rights of which may be bought and sold. Users are designated as STANDARD or VIP users, with standard users able to subscribe to content files generated by VIP users.

22 Claims, 10 Drawing Sheets

LOCATION-BASED CONTENT ENABLEMENT SYSTEM

CROSS-REFERENCE TO RELATED APPLICATIONS

This application is a continuation of co-pending U.S. application Ser. No. 14/164,197, filed on Jan. 25, 2014, and entitled "LOCATION-BASED CONTENT ENABLEMENT SYSTEM." U.S. application Ser. No. 14/164,197 is incorporated by reference herein, in its entirety, for all purposes.

STATEMENT REGARDING FEDERALLY SPONSORED RESEARCH AND DEVELOPMENT

Not Applicable.

FIELD OF THE INVENTION

This invention relates to content enablement on portable electronic devices, and more particularly to a location-based content enablement system.

DISCUSSION OF RELATED ART

Social media sites such as Facebook.com and FourSquare.com allow users to "check in" at various locations based on a detected location of the user's portable electronic device (PED). This allows users to easily alert their friends on these services of their whereabouts, but does little to inform friends about what they are experiencing at that location. Accordingly, users often want to be able to post a photo or video of their experiences at certain locations, such as concert halls, nightclubs, national parks, or other venues. But the visibility of such content files on traditional social media sites is often short-lived, scrolling off the bottom of one's "news feed" within a day or two, and is thereafter only searchable chronologically, not by venue location.

People more often associate memories with their location and whom they were with, not necessarily by date or chronologically. As such, there is a need for a system that allows users to post media and text files and associate those files with a location and/or the people with them. In such a system, such "memory" content files would be accessible when the user returns to the location, or is again with the same people.

Google Maps and other services allow users to geographically tag image files, such as image files associated with a landmark or other object. However, such image files are public, and users often wish their content files to be public, or only sharable with their friends or the people who shared the experience.

Therefore, there is a need for a system that allows photos, videos and the like of user experiences to be shared with only certain designated people, or with the public, at the user's option. Such a needed system would prevent users from seeing such content files unless they were physically present at the location associated with the content file. The present invention accomplishes these objectives.

SUMMARY OF THE INVENTION

The present device is a content enablement system that enables or disables presentation of a computer-playable content file, such as a text file, an image file, a video file, an audio file, or the like. The content file is enabled for presentation, i.e. playback or display, based on the proximity of a portable electronic device (PED) of a user with an object that has a unique identifier, such as a specific geographic location, landmark, business, or even another person. The system provides for the generation of the content file and the association with the content file with the object, assuming the PED is within a predetermined distance of the object. The system thereafter only allows the content file to be presented back to the user, such as on his PED, if the PED is within the predetermined distance of the object.

A location services module determines the proximity of the PED to the object. Such a location services module is resident on the PED, and may include, for example, a geographic location system such as a GPS-based system. As such, with the PED determining its geographic location on a geographic coordinate system, and with a list of locations of objects and their unique identifiers (such as corresponding geographic coordinates, or the like), the system determines if the PED is within the predetermined distance of the object.

The location services module may also or alternately include a wireless radio signal system, wherein the object includes a wireless transmitter for broadcasting its unique identifier. The location services module may also or alternately include an optical camera, wherein the object has a unique optical signature.

In one embodiment, the location of the PED may be entered manually by the user. Likewise, the location of the PED may be updated in the system by third-party services that provide so-called "check-in" features. The location services module may further update the location of the PED periodically.

Further, wherein the object is identified by the unique identifier being geographic coordinates, a bar code, a street address, a parcel number, a unique object identification number, or the like, the user is prompted to provide an alias that is easier for the user to identify and remember. Thereafter, the alias is displayed to the user instead of the geographic coordinates or street address of the object.

The system further includes a content capture module for capturing and saving the content file in the first non-transitory computer-readable storage medium, which is accessible by the PED. The content capture module may include the camera, a microphone, a keyboard for text input, or the like. As such, the content file may be a text file, an audio recording, a video recording, a still image, or the like. The content file when captured within the predetermined distance of the object, as determined by the location services module, is associated with the unique identifier of the object.

The system further includes a content playback module for enabling presentation of the content file while the PED remains within the predetermine distance of the object. When the PED moves beyond the predetermined distance from the object, the content file is disabled from be presented, i.e., played or viewed. The content playback module is adapted to display visual content files, such as still images or videos, on a display of the PED, and to play audio content files, such as audio files or video files, on speakers of the PED, or other sound transducers thereof such as earphones.

In this manner, the content file may be captured by the content capturing module and associated with any object that is within the predetermined distance. The content file is not able to be played or viewed when the user and his PED move beyond the predetermined distance. The content file may be further associated with an object, such as a landmark at a geographic location, and simultaneously with another user who is also present when the content file is generated. As such, the content file may be presented when the PED is either with the predetermined distance of the object or the predetermined distance of the other user.

In an alternate and preferred embodiment, the system further includes a server in communication with the PED through a network, such as the Internet or a cellular network. The server includes the first non-transitory computer-readable storage medium, and the PED includes a second non-transitory computer-readable storage medium.

In such an embodiment, the location services module includes a client portion that determines and communicates the location of the PED to the server and a server portion that determines the proximity of the PED to the object, based on a list of such objects in the server's first non-transitory computer-readable storage medium and their known locations. Likewise, the content capturing module includes a client portion for capturing and communicating the content file to the server and a server portion that saves the content file in the first non-transitory computer-readable storage medium and associates the content file with the unique identifier of the object. The content playback module, in such an embodiment, includes a server portion that provides a list of content files that are enabled for presentation on the PED, or elsewhere, and a client portion that presents the content list and then the selected content file selected by the user, typically with the display and/or speakers of the PED.

The content capturing module may be adapted to prompt the user to select one of a plurality of privacy levels to associate with the content file.

A presentation system may be established proximate the object and adapted to receive and present the content files associated with the object. Such content files are delivered to the presentation system by the server, and may be displayed in a substantially random manner, a sequential manner, or other sort order. Alternately, the server may deliver only content files wherein the user who generated the content file is present at the location of the object.

In one embodiment, all of the content files associated with the object may be grouped into a virtual property. The moderating rights for the virtual property may be bought and sold, such rights giving the owner the ability to moderate the content files that are enabled at the location. For example, the owner may determine which content files to be displayed, and may delete or rename such content files. The owner may also establish the presentation system and determine which content files are presented thereon, and what mix of files to present between users who are present at the location or not. The server may download additional content files associated with the object or location from other social media sources, or may accept content files uploaded by the owner, in addition to obtaining just the content files from users.

In one embodiment of the system, all users are designated with a status as either a STANDARD user or a VIP user. Standard users are given the option of subscribing to the content files generated by a VIP user, but preferably only when the PED of the standard user is within a second predetermined distance of a PED of the VIP user, as determined by the location services module and the server. The system may alert the user that a VIP user is nearby and then prompt the user if he would like to subscribe to the content files of the VIP user. Such content files of the VIP user may be disabled by the system to all subscribing users of the VIP user after a preset expiration time.

The system may be embodied within a non-transitory computer-readable storage medium that is part of the PED, or part of the server, or both. The system is implemented with a set of computer readable instructions, or an application (a so-called "app"), that, when executed by at least one processor of the PED and/or the server, cause the at least one processor to perform the operations that enable the generation of the computer-playable content file, the presentation of the content file on either the user's PED or elsewhere, based principally on the proximity of the user's PED with an object. The application may be split between a PED-based app and a server application, for example, working in tandem. As such, the server may be in communication with many instances of the PED-based app simultaneously.

The present system and method allows users to post media and text files and associate those files with a location and/or the people accompanying them. Such "memory" content files are accessible only when the user returns to the location, or is again with the same people. The present system allows photos, videos and the like of user experiences to be shared with only certain designated people, or with the public, at the user's option. The system prevents users from seeing such content files unless they are physically present at the location associated with the content file. As such, a collection of memories associated with certain locations or objects can be grouped into virtual properties that are licensed. Other features and advantages of the present invention will become apparent from the following more detailed description, taken in conjunction with the accompanying drawings, which illustrate, by way of example, the principles of the invention.

DETAILED DESCRIPTION OF THE PREFERRED EMBODIMENT

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein,"

"above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list. When the word "each" is used to refer to an element that was previously introduced as being at least one in number, the word "each" does not necessarily imply a plurality of the elements, but can also mean a singular element.

Figure 1:
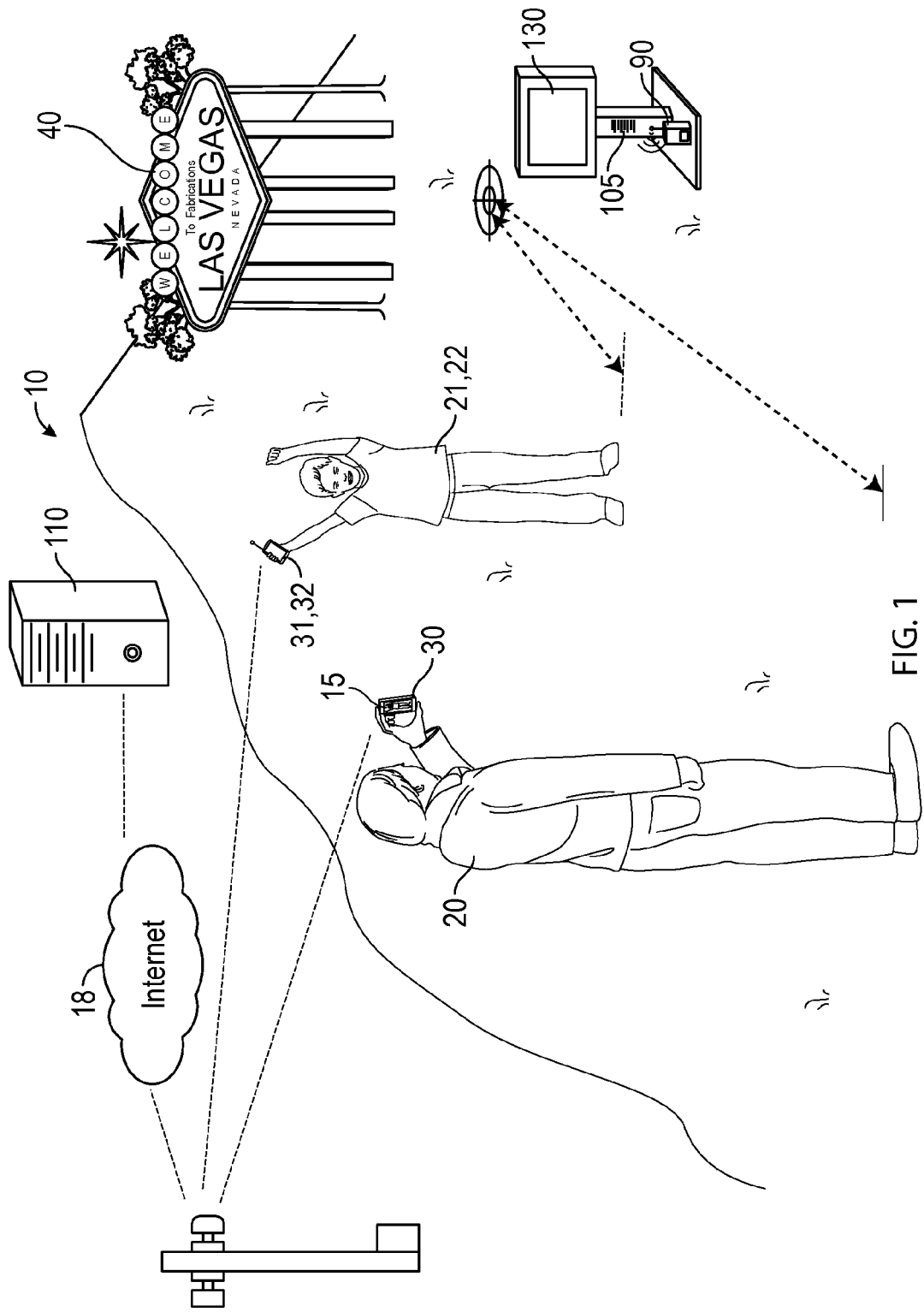
FIG. 1 is a diagram of the system of the invention.
Figure 2A:
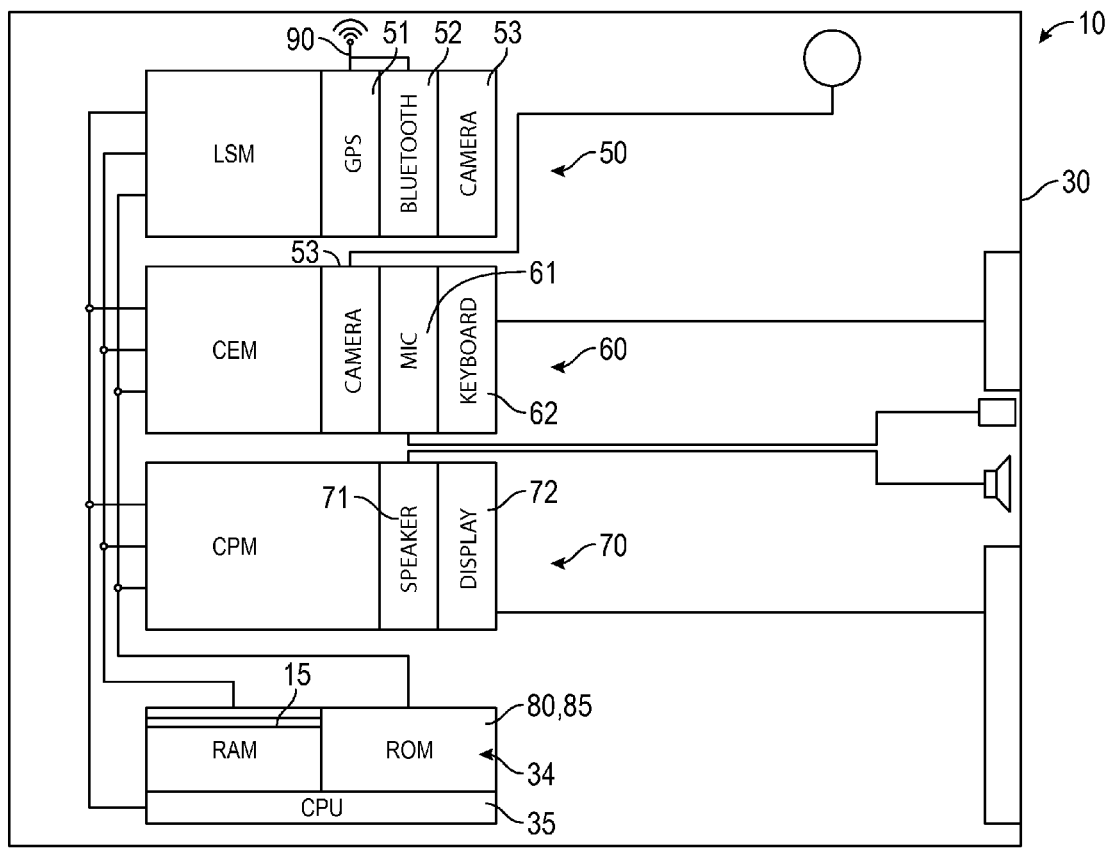
FIG. 2A is a diagram of components of the system resident on a user's portable electronic device.
Figure 2B:
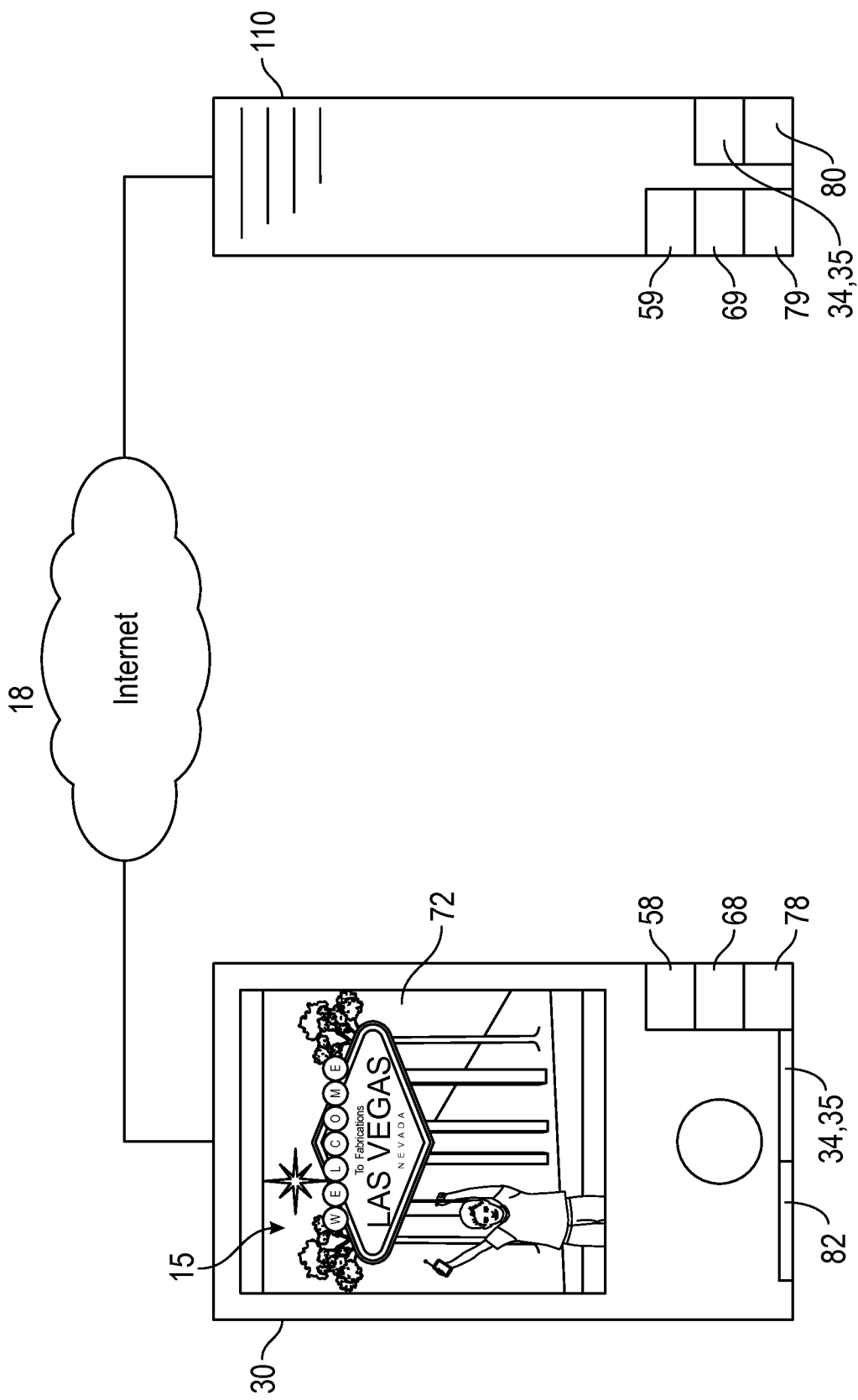
FIG. 2B is a diagram of components of the system that includes a server in communication with the portable electronic device through a network.

FIGS. 1, 2A and 2B illustrate a content enablement system 10 that enables or disables presentation of a computer-playable content file 15, such as a text file, an image file, a video file, an audio file, or the like. The content file 15 is enabled for presentation, ie., playback or display, based on the proximity of a portable electronic device (PED) 30 of a user 20 with an object 40 that has a unique identifier 45. The system 10 provides for the generation of the content file 15 and the association with the content file 15 with the object 40, assuming the PED 15 is within a predetermined distance $P_{min}$ of the object 40. The system 10 thereafter only allows the content file 15 to be presented back to the user 20, such as on his PED 30, if the PED 30 is within the predetermined distance $P_{min}$ of the object 40.

A location services module 50 determines the proximity $P_0$ of the PED 30 to the object 40. Such a location services module 50 is resident on the PED 30, and may include, for example, a geographic location system 51 such as a GPS-based system, GSM localization systems, indoor positioning systems such as geomagnetic positioning systems, or the like. As such, with the PED 30 determining its geographic location on a geographic coordinate system, and with a list of locations of objects 40 and their unique identifiers 45 (such as corresponding geographic coordinates, or the like), the system 10 determines if the PED 30 is within the predetermined distance $P_{min}$ of the object 40.

The location services module 50 may also or alternately include a wireless radio signal system 52, wherein the object 40 includes a wireless transmitter 90 for broadcasting its unique identifier 45. For example, the object 40 may be another user 21 with another PED 31. As such, a radio link can be established between the PEDs 30,31, the strength of which corresponds roughly with a distance $P_0$ between the two PEDs 30,31. Each PED 30,31 broadcasts its unique identifier 45, such as its international mobile equipment identity (IMEI), international mobile subscriber identity (IMSI), serial number, or the like.

By way of another example, the object 40 may be a physical landmark with a wireless transmitter 90 that is fixed at a known location close to the object 40. The wireless transmitter 90 in such a case broadcasts the unique identifier 45, such as a physical mailing address, or geographic coordinates such as longitude/latitude coordinates, or the like. As such the system 10 can compare the location of the PED 30 with the known location of the object 40 to determine if the PED 30 is within the predetermined distance $P_{min}$ of the object 40.

The location services module 50 may also or alternately include an optical camera 53, wherein the object 40 has a unique optical signature 100. For example, wherein the object 40 is another user 21, the location services module 50 may use the camera 53 to obtain an image of the other user 21 and then use facial recognition routines, as known or as become known, to identify the other user 21 as the object 40. The size of the image of the other user 21 can be used to determine a rough distance $P_0$ that the PED 30 is away from the other user 21.

By way of another example, the object 40 may be a physical landmark with a barcode 105, QR code, or other visually unique optical signature 100. Alternately or additionally the camera 53 may be used by the location services module 50 to capture an image of nearby objects or landscapes, and then compare the image to known images of objects 40 to determine if there is a match. For example, the object 40 may be a particular statue in Central Park. Image recognition routines are used to determine, based on the size of the recognized image, a rough distance $P_0$ that the PED 30 is away from the object 40.

In one embodiment, the location of the PED 30 may be entered manually by the user, such as by mailing address, geographic coordinates, or location name. Likewise, the location of the PED 30 may be updated in the system 10 by third-party services (not shown) that provide so-called "check-in" features, such as FourSquare.com, Facebook.com, Yelp.com or the like. The location services module 50 may further update the location of the PED 30 in the system 10 periodically, upon a refresh operation of the user 20, when the system 10 is initiated on the PED 30, or the like.

Figure 6:
FIG. 6 is an example interface screen showing a unique designator, in this case a physical mailing address, of an object, in this case a physical place.
Figure 7:
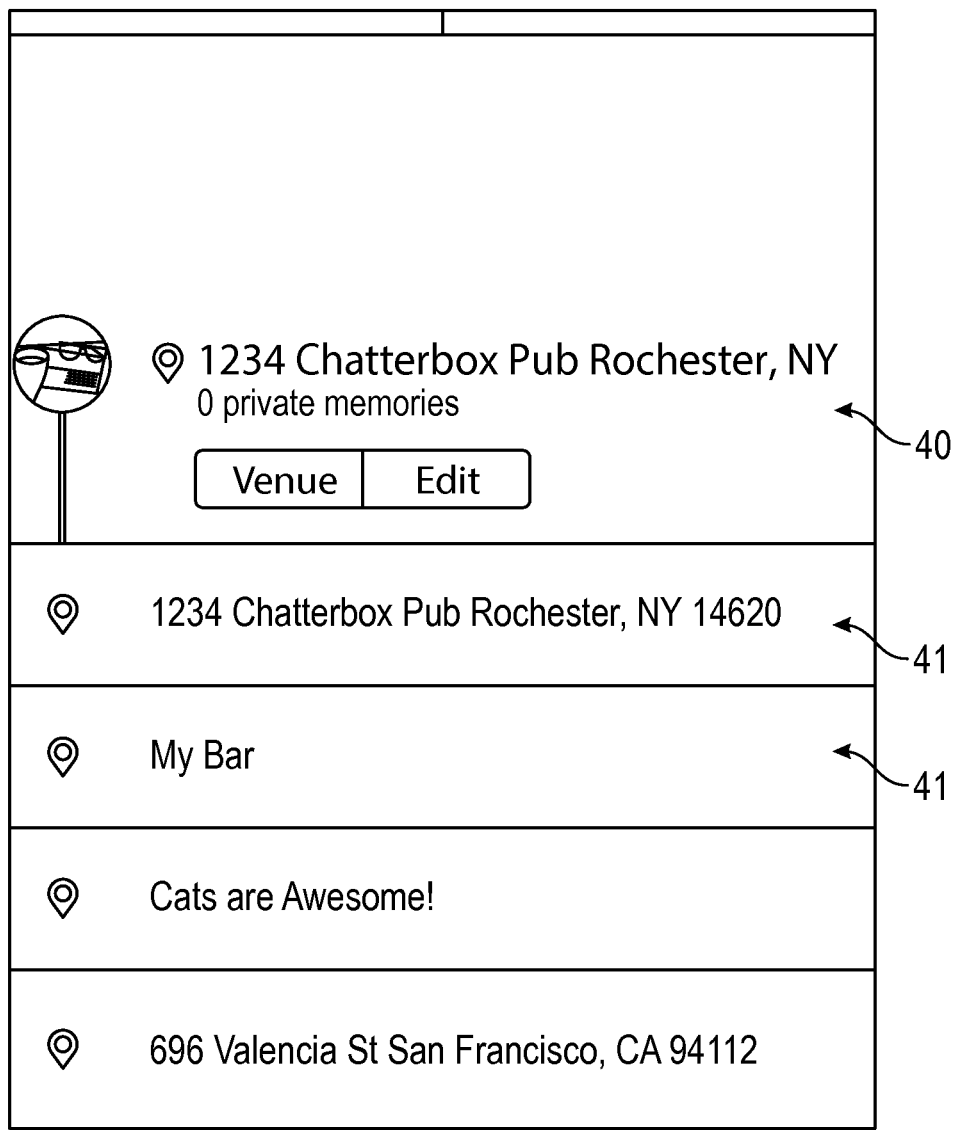
FIG. 7 is an example interface screen showing a list of aliases of objects frequented by the user.
Figure 8:
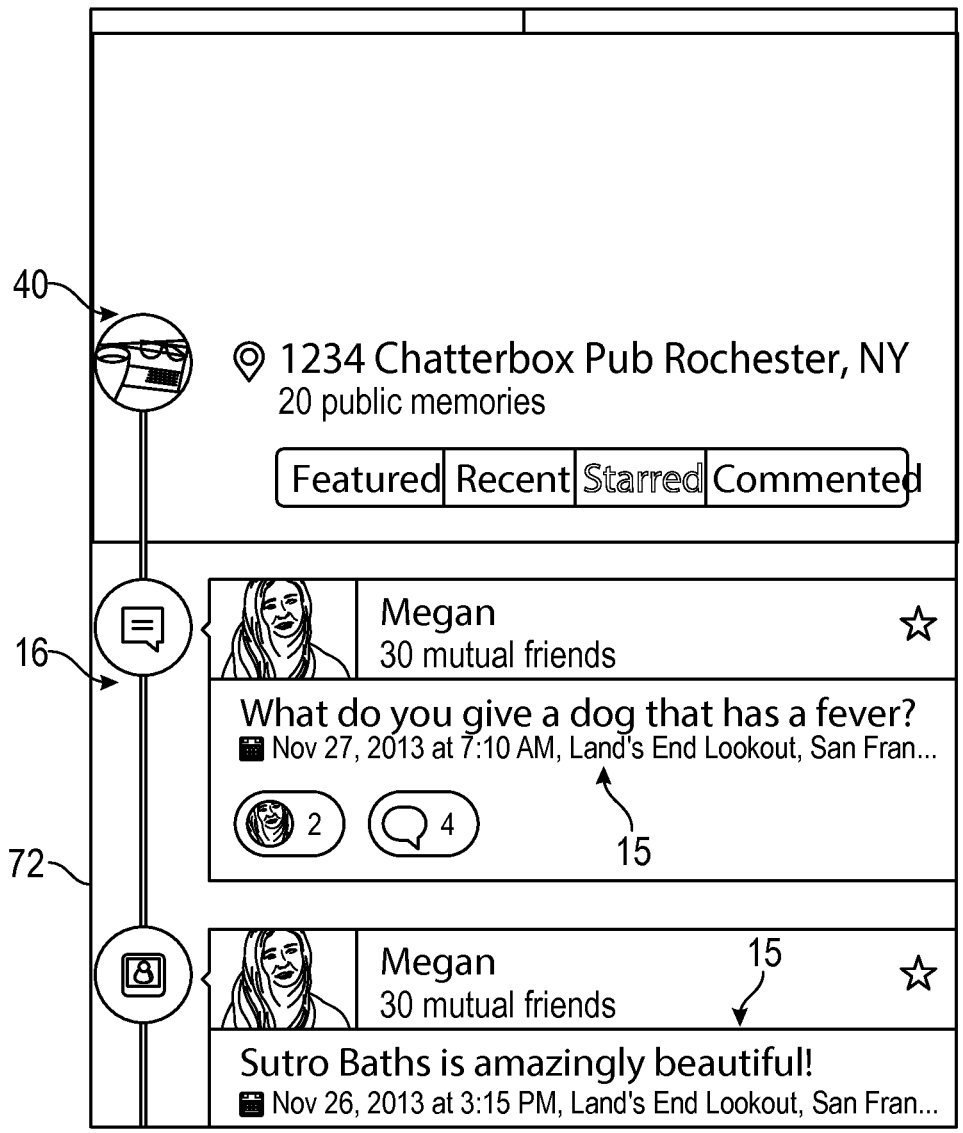
FIG. 8 is an example interface screen showing a list of content files associated with an object, in this case a physical place.

Further, wherein the object 40 is identified by the unique identifier 45 being geographic coordinates, a bar code 105, a street address, a parcel number, a unique object identification number, or the like, the user 20 is prompted to provide an alias 41 that is easier for the user 20 to identify and remember. For example, a location identified by a physical address that is proximate the user 20 (FIG. 6) may be provided an alias 41, such as the name of an establishment at that address (FIG. 7). Thereafter, the alias 41 is displayed to the user 20, not the unique identifier 45 or cryptic geographic coordinates or street address (FIG. 8).

The system 10 further includes a content capture module 60 for capturing and saving the content file 15 in the first non-transitory computer-readable storage medium 80, which is accessible by the PED 30. The content capture module 60 may include the camera 53, a microphone 61, a keyboard 62 for text input, or the like. As such, the content file 15 may be a text file, an audio recording, a video recording, a still image, or the like. The content file 15 when captured within the predetermined distance $P_{min}$ of the object 40, as determined by the location services module 50, is associated with the unique identifier 45 of the object 40.

The system 10 further includes a content playback module 70 for enabling presentation of the content file 15 while the PED 30 remains within the predetermine distance $P_{min}$ of the object 40. When the PED 30 moves beyond the predetermined distance $P_{min}$ from the object 40, the content file 15 is disabled from be presented, ie., played or viewed. The content playback module 70 is adapted to display visual content files 15, such as still images or videos, on a display 72 of the PED 30, and to play audio content files 15, such as audio files or video files, on speakers 71 of the PED 30, or other sound transducers thereof such as earphones.

In this manner, the content file 15 may be captured by the content capturing module 60 and associated with any object 40 that is within the predetermined distance Pmin, such as 10 meters, for example. The content file 15 is not able to be played or viewed when the user 20 and his PED 30 move beyond the predetermined distance Pmin. The content file 15 may be images or video clips of friends sharing an experience at the location of the object 40, for example, and only when the user returns to the object 40 is he allowed to view the content files 15 associated with the object 40.

Figure 4:
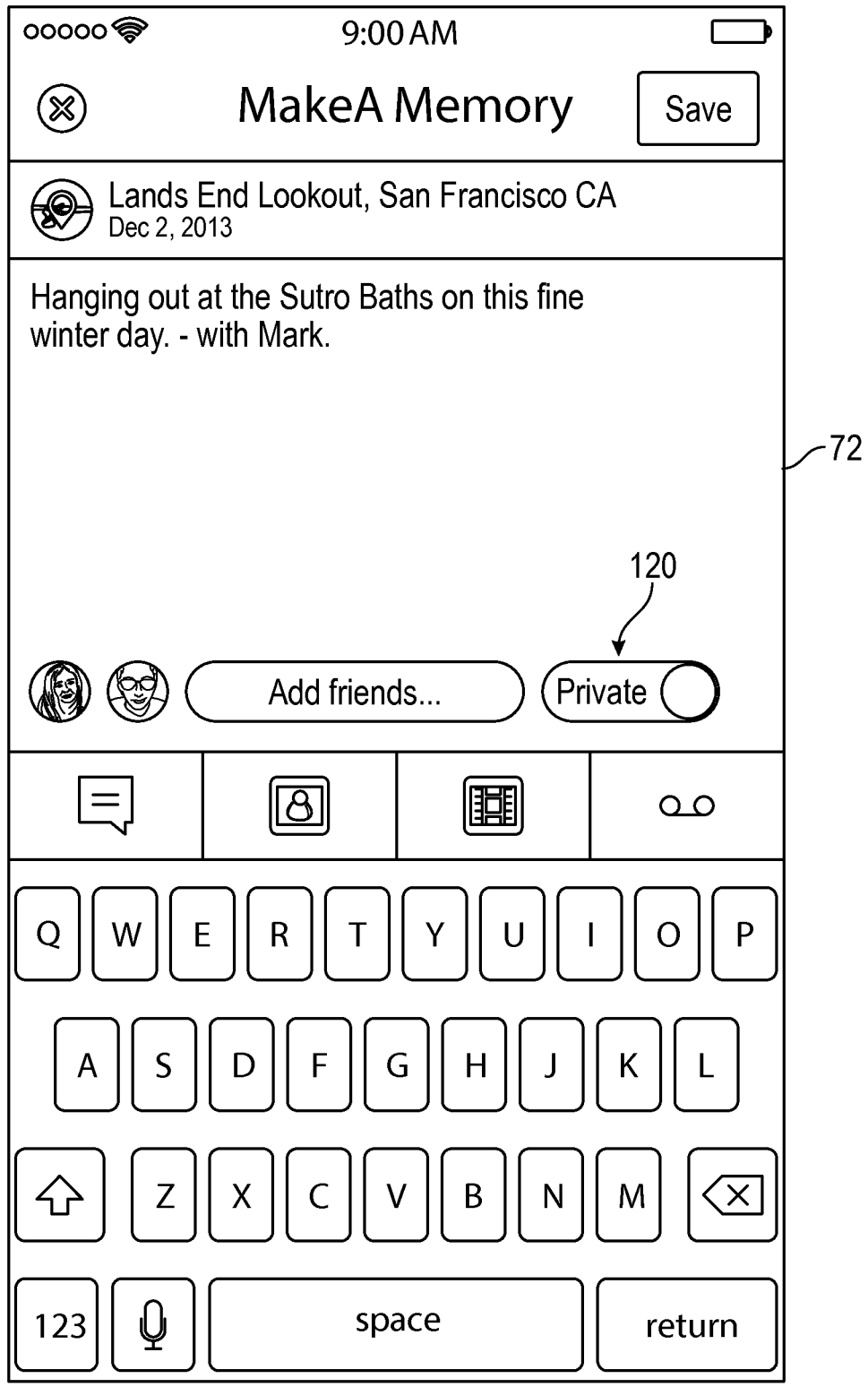
FIG. 4 is an example interface screen allowing the user to generate a content file.

The content file 15 may be further associated with an object 40, such as a landmark at a geographic location, and simultaneously with another user 21 who is also present when the content file 15 is generated (FIG. 4). As such, the content file 15 may be presented when the PED 30 is either with the predetermined distance $P_{min}$ of the object 40 or the predetermined distance $P_{min}$ of the other user 21.

In all of the aforementioned embodiments, a list of known objects 40 may be included in a first non-transitory computer-readable storage medium 80 of the PED 30, associated with their unique identifiers 45 and geographic coordinates, if required. In such aforementioned embodiments, the system 10 principally resides on the user's PED 30.

In an alternate and preferred embodiment, the system 10 further includes a server 110 in communication with the PED 30 through a network 18, such as the Internet or a cellular network. The server 110 includes the first non-transitory computer-readable storage medium 80, and the PED 30 includes a second non-transitory computer-readable storage medium 82.

Figure 3:
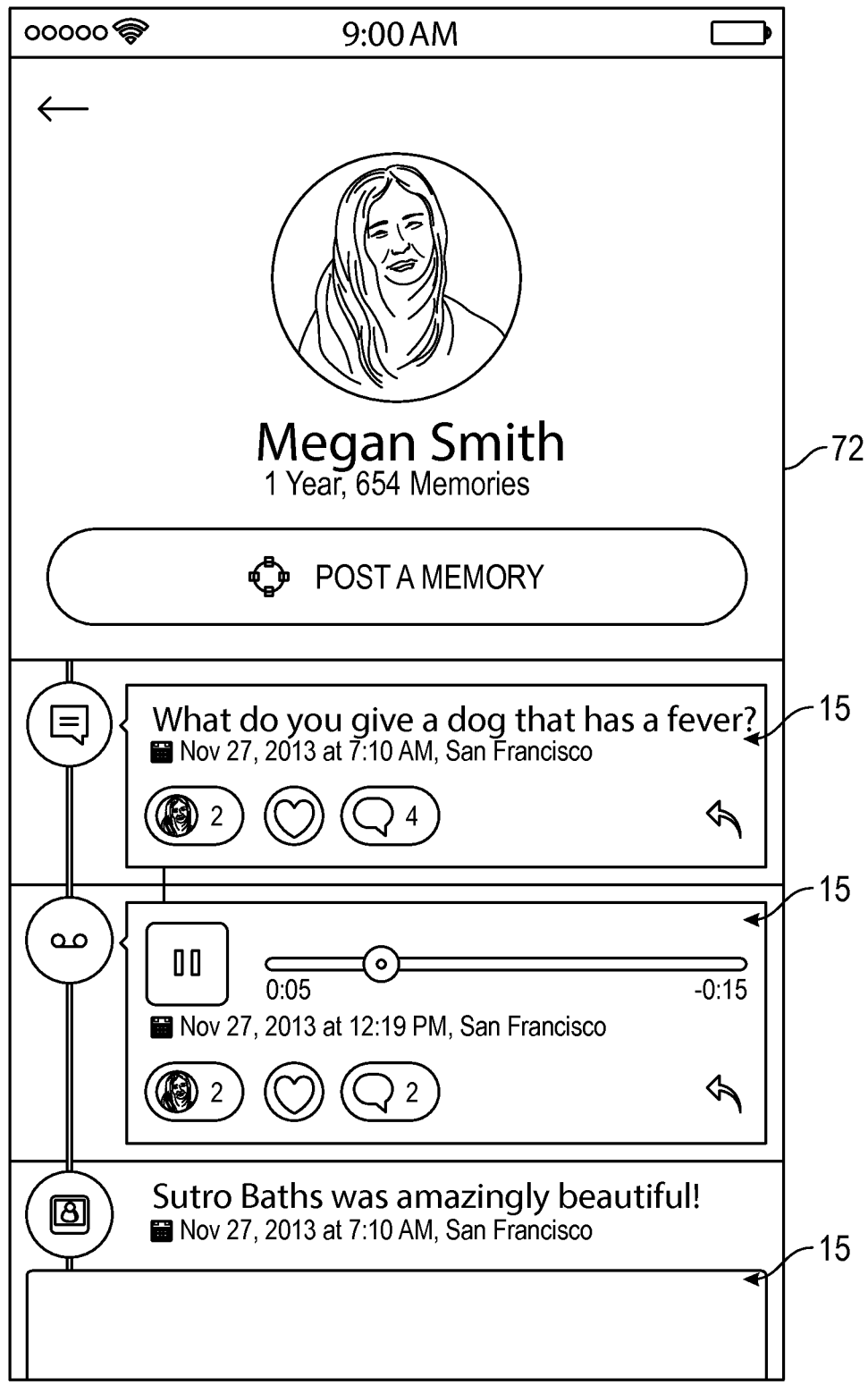
FIG. 3 is an example interface screen showing a list of content files of a user.

In such an embodiment, the location services module 50 includes a client portion 58 that determines and communicates the location of the PED 30 to the server 110 and a server portion 59 that determines the proximity $P_O$ of the PED 30 to the object 40, based on a list of such objects 40 in the server's first non-transitory computer-readable storage medium 80 and their known locations. Likewise, the content capturing module 60 includes a client portion 68 for capturing and communicating the content file 15 to the server 110 and a server portion 69 that saves the content file 15 in the first non-transitory computer-readable storage medium 80 and associates the content file 15 with the unique identifier 45 of the object 40. The content playback module 70, in such an embodiment, includes a server portion 79 that provides a list (FIG. 3) of content files 15 that are enabled for presentation on the PED 30, or elsewhere, and a client portion 78 that presents the content list and then the selected content file 15 selected by the user, typically with the display 72 and/or speakers 71 of the PED 30.

In one embodiment of the system 10, the content capturing module 70 is adapted to prompt the user 20 to select one of a plurality of privacy levels 120 (FIG. 4) to associate with the content file 15. For example, the content file 15 may be designated with privacy levels PRIVATE, FRIEND, or PUBLIC. In the case of content files 15 designated as PRIVATE, only the user 20 may be play or view the content file 15, and only when near the associated object 40 (be it a place or another person).

A content file 15 designated as FRIEND may be viewed by any other user 21 who has designated the user 20 as a friend and whom is designated as a friend by the user 20 (FIG. 5), regardless of the location of the other user 21. Such a content file 15 may be enabled for the other user 21 for only a preset expiration time 150, such as 100 minutes from the generation of the content file 15, for example.

A content file 15 designated as PUBLIC may be viewed by any other user 21 within the predetermined distance $P_{min}$ of the object 40, such that the other user 21 may view the content files 15 associated with the object 40 of the user 20 while at the same location. Further, a content file 15 designated as PUBLIC may further additionally be treated as a content file 15 designated as FRIEND, wherein the content file 15 may be viewed by any other user 21 who has designated the user 20 as a friend and whom is designated as a friend by the user 20, regardless of the location of the other user 21. Such a content file 15 may be enabled for the other user 21 for only a preset expiration time 150, such as 100 minutes from the generation of the content file 15, for example, when the other user 21 is outside of the predetermined distance $P_{min}$ of the object 40.

Figure 5:
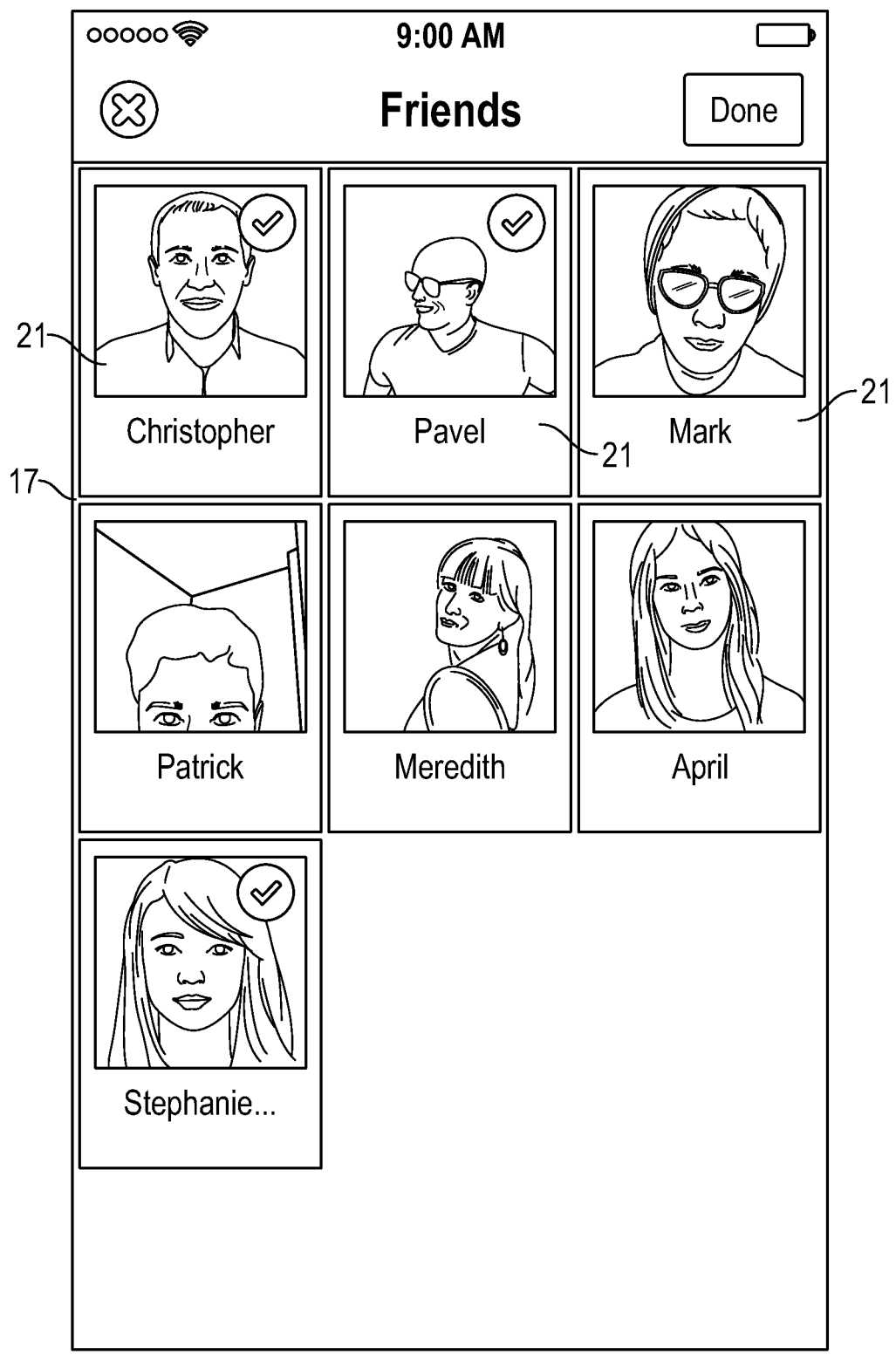
FIG. 5 is an example interface screen showing a list of other users that are designated as friends of the user.

In one embodiment, content files 15 may be associated with any user 20 or other user 21 who is "tagged" as being proximate the object 40 when the content file 15 is generated (FIG. 5). Such tagging can be manually associated with the content file 15 by the user 20, or by the server 110 which knows all of the other users 21 that are in the same location and proximate the object 40. Accordingly, any other user 21 associated with the content file 15 in such a way, ie., other "tagged" users, may access the content file 15 just as the user 20 may access the content file 15. In one embodiment, the user can share a PUBLIC content file 15 with any of the other users 21 designated as friends by the user 20, and set a desired expiration time during which the content file 15 is enabled for those other users 21 with whom the content file 15 is shared.

In one embodiment, a presentation system 130 may be established proximate the object 40 and adapted to receive and present the content files 15 designated as PUBLIC and associated with the object 40. Such content files 15 are delivered to the presentation system 130 by the server 110, and may be displayed in a substantially random manner, a sequential manner, or other sort order. Alternately, the server 110 may deliver only content files 15 designated as PUBLIC and wherein the user 20 who generated the content file 15 is present at the location of the object 40, ie., within the predetermined distance $P_{min}$ of the object 40.

For example, a nightclub may be the object 40, and the presentation system 130 may be a display screen and speakers connected with a computer (not shown) that is connected to the server 110 through the network 18. As such, the server 110 may deliver PUBLIC content files 15, such as image files or video files, generated at the nightclub by users 20 of the system 10. As such, any particular user 20 may be able to observer one of his content files 15 being displayed on the presentation system 130, but only when he is located at the nightclub as determined by the location services module 50. Clearly the content files 15 may be mixed in any manner between those content files 15 of users 20 who are present at the nightclub and those that are not, such as, for example, 80%/20%, or 50%/50%, or in some other ratio as determined by an owner of the presentation system 130 and/or nightclub 40.

In such an embodiment, all of the content files 15 of all users 20 designated as something other than PRIVATE, for example, and that are associated with the object 40, for example the nightclub 40, may be grouped into a virtual property 160. The virtual property 160 may encompass one or more objects 40, such as, for example, all restaurants of a particular chain of restaurants, or all of the establishments in a particular shopping mall. The moderating rights for the virtual property 160 may be bought and sold, such rights giving the owner the ability to moderate the content files 15 that are enabled at the location 40. For example, the owner may determine which content files 15 to be displayed, and may delete or rename such content files 15. The owner may also establish the presentation system 130 and determine which content files 15 are presented thereon, and what mix of files to present between users who are present at the location or not. The server 110 may download additional content files 15 associated with the object or location 40 from other social media sources, or may accept content files 15 uploaded by the owner, in addition to obtaining just the content files 15 from users 20.

In one embodiment, the owner of the presentation system 130 or property 160 may request the server 110 to remind the user 20 of one or more of the content files 15 in an effort to entice the user 20 back to the object or location 40, such as through an email reminder (not shown), text message or the like. Such an email may include the content file 15, so that the user 20 may remember the experience at the location 40 and perhaps decide to return soon. Clearly the owner of the presentation system 130, or the property 160, may be charged a price for such a service.

Figure 9:
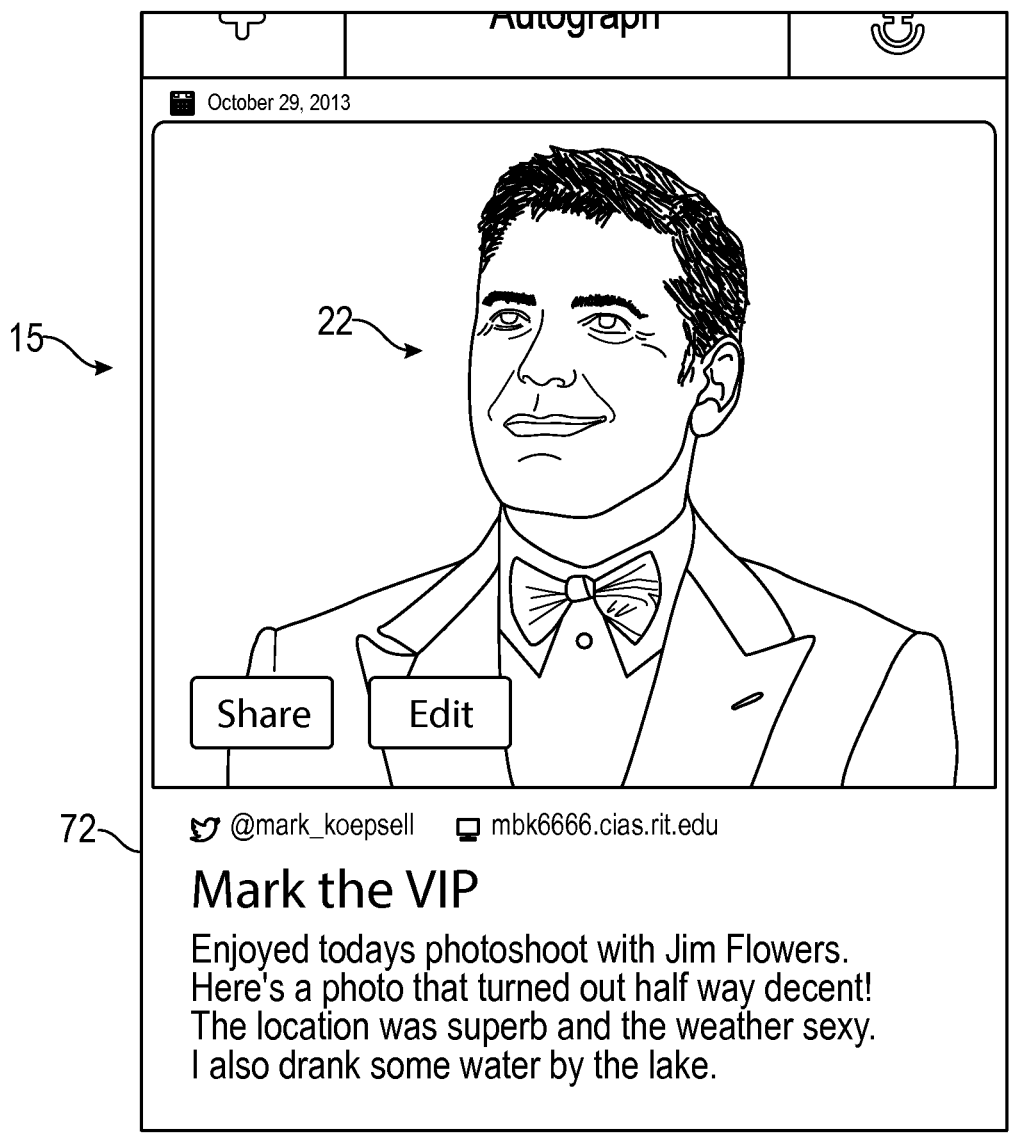
FIG. 9 is an example interface screen showing a content file generated by a VIP user of the system.

In one embodiment of the system 10, all users 20 are designated with a status as either a STANDARD user 20 or a VIP user 22 (FIG. 9). Standard users 20 are given the option of subscribing to the content files 15 generated by a VIP user 22, but preferably only when the PED 30 of the standard user 20 is within a second predetermined distance $P_{min2}$ of a PED 32 of the VIP user 22, as determined by the location services module 50 and the server 110. The system 10 may alert the user 20 that a VIP user 22 is nearby and then prompt the user 20 if he would like to subscribe to the content files 15 of the VIP user 22. Such content files 15 of the VIP user 22 may be disabled by the system 10 to all subscribing users 20 of the VIP user 22 after a preset expiration time 150, for example. As such, a VIP user 22 may generate a content file 15, such as an image of himself at a party venue 40, for example, and all subscribing users 20 are able to see the content file 15 until the preset expiration time, such as 100 minutes from when the content file 15 is generated. Further, whenever the VIP user 22 is within a predetermined third distance from a subscribed user 20, the subscribed user 20 receives notification of same. The user 20 has the option of disabling such notifications on his PED 30. VIP users 22 have the option of blocking the reporting of their location and designating time windows throughout the day when their location is automatically blocked, such as during normal sleeping hours, for example.

The system 10 may be embodied within a non-transitory computer-readable storage medium that is part of the PED 30, or part of the server 110, or both. The system 10 is implemented with a set of computer readable instructions, or an application 11 (a so-called "app"), that, when executed by at least one processor 35 of the PED 30 and/or the server 110, cause the at least one processor 35 to perform the operations that enable the generation of the computer-playable content file 15, the presentation of the content file 15 on either the user's PED 30 or elsewhere, based principally on the proximity of the user's PED 30 with an object 40. The application 11 may be split between a PED-based app and a server application, for example, working in tandem. As such, the server 110 may be in communication with many instances of the PED-based app simultaneously.

In one embodiment, even when content files 15 are not be enabled for the user 20, such as when the user 20 is located away from the object 40, the system 10 through the application 11 may inform the user 20 as to how many content files 15 are associated with each object 40, displaying preferably the alias 41 of the object 40. Upon returning to a location near the object 40, the content files 15 associated with the object 40 are listed by the application 11 (FIG. 8), at which time the user 20 may select any of the listed content files 15 for playback or viewing, either on the PED 30 or, optionally, to be queued for playback on the presentation system 130 if such is allowed by the owner of the presentation system 130.

While a particular form of the invention has been illustrated and described, it will be apparent that various modifications can be made without departing from the spirit and scope of the invention. Accordingly, it is not intended that the invention be limited, except as by the appended claims.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

What is claimed is:

1. A content enablement system that enables presentation of a computer-playable content file based on the proximity of a portable electronic device of a user with an object having a unique identifier, the system comprising:
    a location services module for determining the proximity of the portable electronic device to the object;
    a content capturing module for capturing and saving the content file in a first non-transitory computer-readable storage medium accessible by the portable electronic device and associating the content file with the unique identifier of the object; and
    a content playback module for enabling presentation of the content file while the portable electronic device remains within a predetermined distance of the object, and for disabling presentation of the content file while the portable electronic device remains beyond a predetermined distance from the object;
    whereby the location services module determines the proximity of the portable electronic device to the object and the object's unique identifier, the content capturing module captures and saves the content file and unique object identifier in the first non-transitory computer-readable storage medium, and the content playback module enables presentation of the content file while the portable electronic device remains within the predetermined distance of the object, disabling presentation of the content file when the portable electronic device moves beyond the predetermined distance of the object.

2. The content enablement system of claim 1 wherein the location services module includes a geographic location system and wherein the unique identifier of the object is the geographic coordinates of the object.

3. The content enablement system of claim 1 wherein the location services module includes a wireless radio signal system, and wherein the object includes a wireless transmitter for broadcasting its unique identifier.

4. The content enablement system of claim 1 wherein the location services module includes an optical camera, and wherein the unique identifier of the object is a unique optical signature of the object.

5. The content enablement system of claim 1 further including a server in communication with the portable electronic device through a network, the server including the first non-transitory computer-readable storage medium, the portable electronic device including a second first non-transitory computer-readable storage medium.

6. The content enablement system of claim 5 wherein the location services module includes a client portion that determines and communicates the location of the portable electronic device to the server and a server portion that determines the proximity of the portable electronic device to the object; and
  wherein the content capturing module includes a client portion for capturing and communicating the content file to the server and a server portion that saves the content file in the first non-transitory computer-readable storage medium and associates the content file with the unique identifier of the object; and
  wherein the content playback module includes a server portion that provides a list of content files that are enabled for presentation on the portable electronic device and a client portion that presents the content list and then a content file selected by the user.

7. The content enablement system of claim 1 wherein the content capturing module is adapted to prompt the user to select one of a plurality of privacy levels to associate with the content file, and to then associate a selected privacy level with the content file.

8. The content enablement system of claim 5 wherein a presentation system proximate the object is adapted to receive and present the content file from the server when the portable electronic device is within the minimum distance of the object.

9. A processor-implemented method that enables presentation of a computer-playable content file based on the proximity of a portable electronic device of a user with an object having a unique identifier, the method comprising the steps:
  a) providing a location services module for determining the proximity of the portable electronic device to the object; a content capturing module for capturing and saving the content file in a first non-transitory computer-readable storage medium accessible by the portable electronic device and associating the content file with the unique identifier of the object; and a content playback module for enabling presentation of the content file while the portable electronic device remains within a predetermined distance of the object, and for disabling presentation of the content file while the portable electronic device remains beyond a predetermined distance from the object;
  b) generating the content file with the content capturing module and then storing the content file in the first non-transitory computer-readable storage medium;
  c) determining a proximity with the location services module between the portable electronic device and the object;
  d) if the proximity between the portable electronic device and the object is within a predetermined distance, associating the content file with the unique identifier of the object; and
  e) enabling presentation of the content file with the content playback module while the portable electronic device remains within the predetermined distance of the object, and disabling presentation of the content file when the portable electronic device moves beyond the predetermined distance of the object.

10. The processor-implemented method of claim 9 wherein the step b) further includes:
  by comparing a geographic location of the portable electronic device generated by a geographic location system of the portable electronic device with known geographic coordinates of the object.

11. The processor-implemented method of claim 9 wherein the step b) further includes:
  by measuring the strength of a wireless radio signal between the portable electronic device and a wireless transmitter of the object transmitting the unique identifier of the object.

12. The processor-implemented method of claim 9 wherein the step b) further includes:
  by comparing an image captured by an optical camera of the portable electronic device and a unique optical signature of the object.

13. The processor-implemented method of claim 9 further including step:
  a') providing a server in communication with the portable electronic device through a network, the server including the first non-transitory computer-readable storage medium;
  the location services module including a client portion that determines and communicates the location of the portable electronic device to the server and a server portion that determines the proximity of the portable electronic device to the object;
  the content capturing module including a client portion for capturing and communicating the content file to the server and a server portion that saves the content file in the first non-transitory computer-readable storage medium and associates the content file with the unique identifier of the object;
  the content playback module including a server portion that provides a list of content files that are enabled for presentation on the portable electronic device and a client portion that presents the content list and then a content file selected by the user.

14. The processor-implemented method of claim 13 further including step:
  b') prompting the user to associate one of a plurality of privacy levels to the content file and then associating a selected privacy level with the content file.

15. The processor-implemented method of claim 13 further including steps:
  b') prompting the user to associate one of a plurality of privacy levels to the content file, designated as "public,"

"friend," and "private," and then associating the selected privacy level with the content file; and f) disabling presentation of the content file for anyone other than the user after a preset expiration time if the selected privacy level of the content file is not "private".

16. The processor-implemented method of claim 13 further including steps:

a") designating all users as either "standard" or "VIP" users, and thereafter allowing the standard user the option of subscribing to the content files generated by a VIP user when the portable electronic device of the standard user is within a second predetermined distance of the portable electronic device of the VIP users, as determined by the server; and g) enabling presentation to the standard user of the content file generated by a VIP user to which the standard user is subscribed until a preset expiration time.

17. The processor-implemented method of claim 15 further including steps:

h) grouping all of the content files that are not designated a privacy level of "private" and that are associated with the object into a virtual property;

i) providing administrative rights to an owner of the virtual property to edit, delete, or present the public content files of all users associated with the property.

18. A non-transitory computer-readable storage medium storing a set of instructions that, when executed by a processor, cause the processor to perform operations that enable presentation of a computer-playable content file based on the proximity of a portable electronic device of a user with an object having a unique identifier, the operations comprising:

b) generating the content file with a content capturing module and then storing the content file in a first non-transitory computer-readable storage medium;

c) determining a proximity between the portable electronic device and the object;

d) if the proximity between the portable electronic device and the object is within a predetermined distance, associating the content file with the unique identifier of the object; and e) enabling presentation of the content file while the portable electronic device remains within the predetermined distance of the object, and disabling presentation of the content file when the portable electronic device moves beyond the predetermined distance of the object.

19. The storage medium of claim 18 wherein the step b) further includes:

by comparing a geographic location of the portable electronic device generated by a geographic location system of the portable electronic device with known geographic coordinates of the object.

20. The storage medium of claim 18 wherein the step b) further includes:

by measuring the strength of a wireless radio signal between the portable electronic device and a wireless transmitter of the object transmitting the unique identifier of the object.

21. The storage medium of claim 18 wherein the step b) further includes:

by comparing an image captured by an optical camera of the portable electronic device and a unique optical signature of the object.

22. The storage medium of claim 18 further including step:

b') prompting the user to associate one of a plurality of privacy levels to the content file and then associating a selected privacy level with the content file.

\* \* \* \* \*